Aug. 9, 1938.   C. F. SMITH   2,125,964
BULLETIN BOARD CONSTRUCTION
Filed April 7, 1936   3 Sheets-Sheet 1
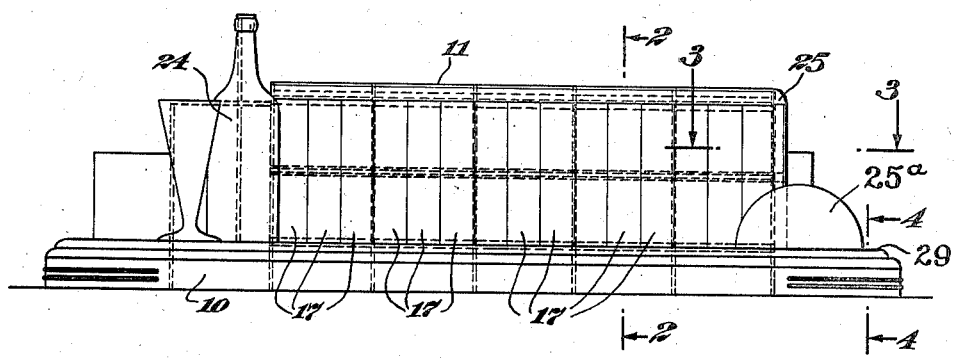
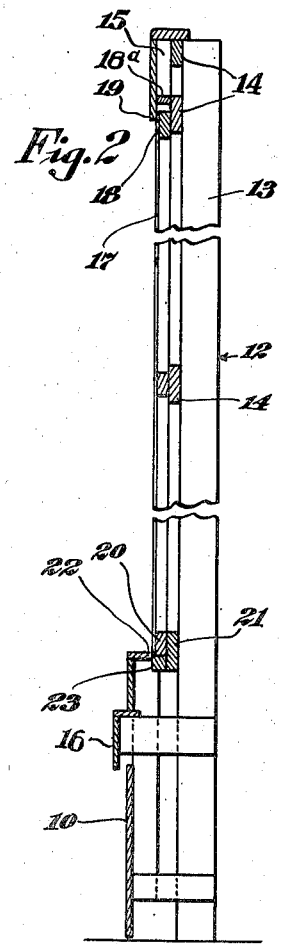
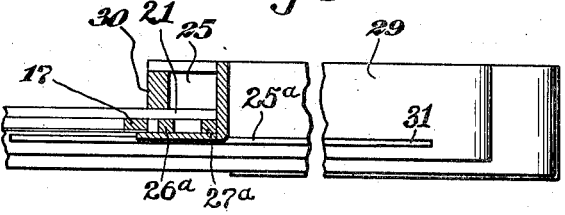
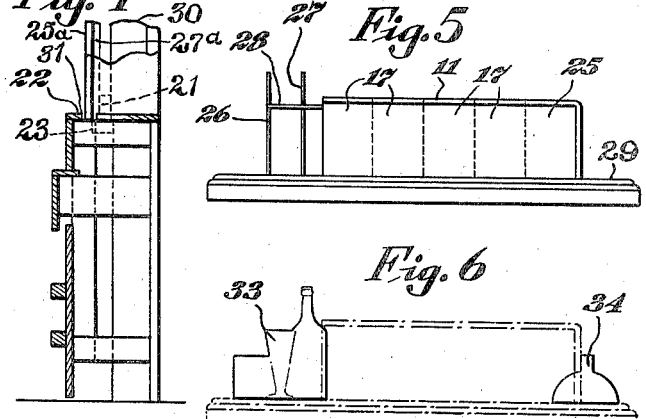
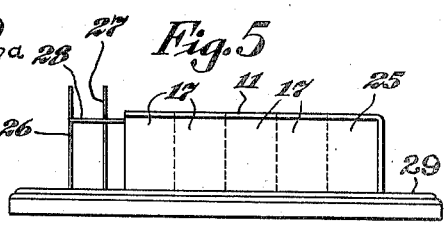
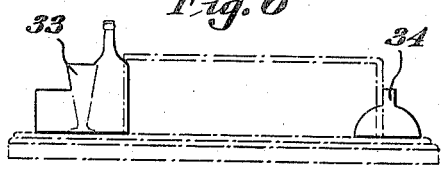
INVENTOR,
C. Frederick Smith,
BY George F. Mallack
HIS ATTORNEY.

Aug. 9, 1938.　　　　C. F. SMITH　　　　2,125,964
BULLETIN BOARD CONSTRUCTION
Filed April 7, 1936　　　　3 Sheets-Sheet 2
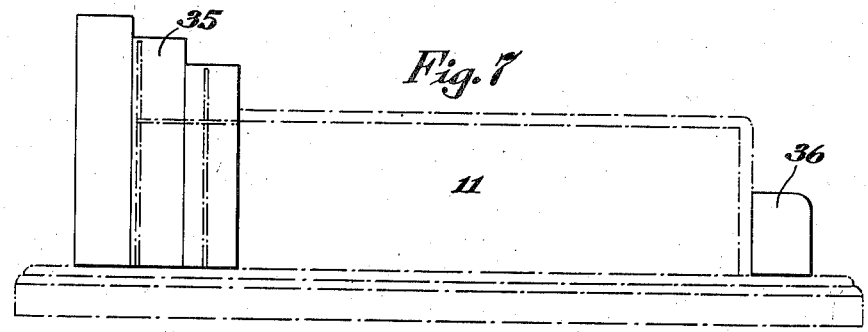
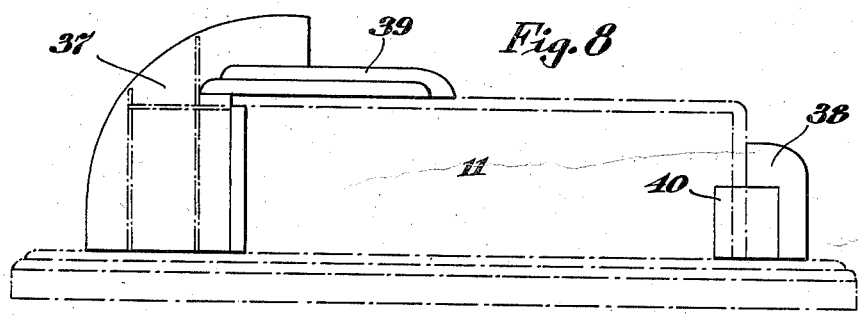
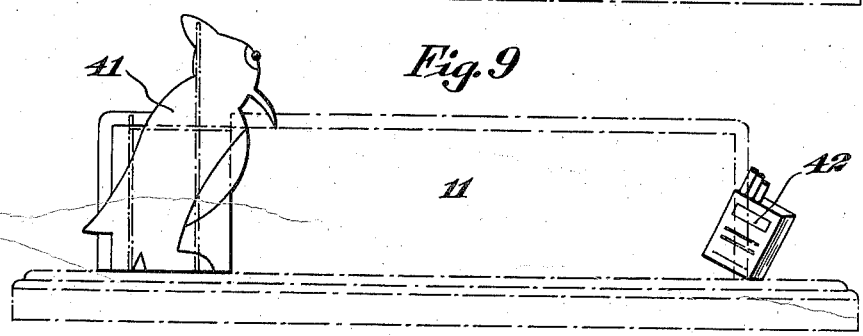
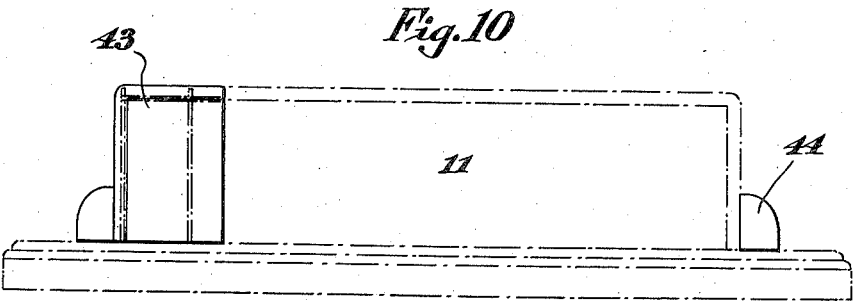
INVENTOR,
C. Frederick Smith,
BY George F. Mattuck
HIS ATTORNEY.

Aug. 9, 1938. C. F. SMITH 2,125,964
BULLETIN BOARD CONSTRUCTION
Filed April 7, 1936  3 Sheets-Sheet 3

INVENTOR,
C. Frederick Smith,
BY George F. Malluck
HIS ATTORNEY.

Patented Aug. 9, 1938

2,125,964

UNITED STATES PATENT OFFICE 2,125,964

BULLETIN BOARD CONSTRUCTION

Charles Frederick Smith, Larchmont, N. Y., assignor to General Outdoor Advertising Co. Inc., New York, N. Y., a corporation of Delaware Application April 7, 1936, Serial No. 73,053

2 Claims. (Cl. 40—125)

This invention relates to display signs, particularly of the outdoor type generally referred to as billboard or bulletin board displays.

In the production and erection of display devices of the aforementioned character, unitary assemblies are erected at considerable cost, to meet the requirements of independent advertisers and advertising programs. Such construction may be of temporary attraction, in line with an advertising policy, to meet temporary as well as changing fancies. A structure once erected and requiring alteration, revision or substitution is burdensome and frequently commercially uneconomical where a rapid change is necessary to meet changes in public trend or for the substitution of advertising display matter.

It is, therefore, an object of my invention to provide a display device in the nature of an outdoor advertising sign billboard or bulletin board which may meet varying requirements, trends, desires and permit rapid interchange of the area devoted to graphic representations, as well as its associated outline configuration.

It is contemplated by my invention to provide a display device in the nature of a bulletin board of permanent background, including an area to which may be affixed interchangeable units, the assembly of which connotes such inter-related graphic representation and including portions for interchangeably associating with this background assembly, pictorial or outlining configurations, the association of which with the first area mentioned will present a pleasing, aesthetic assembly. Thus, it is contemplated by my invention to associate with a framework for providing a bulletin board, interchangeable body, as well as outlining defining elements, so that one general assembly may be varied at will, with speed and economy to suit the exigencies of any variable factor in the display area.

To attain these objects and such further objects as may appear herein or be hereinafter pointed out, I make reference to the accompanying drawings, forming a part hereof, in which—

Figure 1 is a side elevation of a billboard or bulletin board display, in accordance with my invention;

Figure 2 is a section taken on the line 2—2 of Figure 1;

Figure 3 is a fragmentary section taken on the line 3—3 of Figure 1;

Figure 4 is a fragmentary sectional view taken on the line 4—4 of Figure 1;

Figure 5 is a face view, with an end element removed to show the interchangeable end element feature;

Figure 6 is a plan view of figurettes which may be substituted;

Figures 7, 8, 9 and 10 are face views of the base background, with different forms of end figurettes or outlines which may be substituted;

Figure 11:
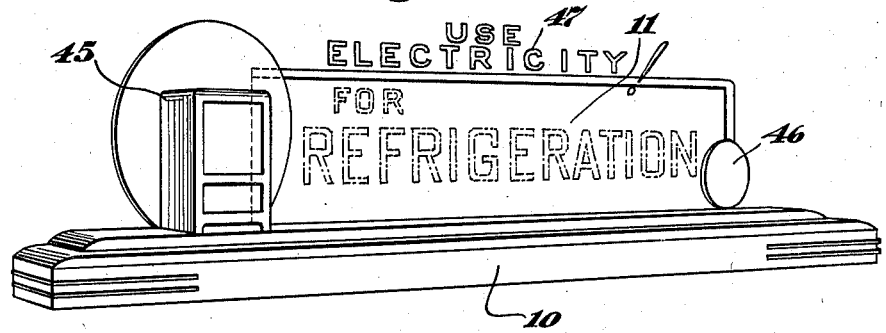
Figure 11 is a perspective view showing the manner of embodying three-dimensional end sections in the bulletin board, in accordance with my invention.

Making reference to the drawing, my invention contemplates the provision of a bulletin board or billboard for display of advertising subject-matter, preferably taking on a so-called modernistic aspect, and for this purpose a base 10 forms the pedestal upon which the billboard framework is supported. This constitutes a primary central area 11, including a permanent framework 12, made of standards 13 and horizontal sections 14, a capital frame 15 and a base frame 16, onto which a plurality of removable sections 17 may be mounted, and held in position at the upper edge 18, beneath the downwardly directed overlap 19 of the capital frame, and may be held at the lower extremity 20 against the member 21 of the frame 14 and the ledge 22 of the pedestal. A filler block 23 supports the elements 17 in frame engaging position. Removability of the sections 17 is, therefore, afforded by the clearance between the capital frame and the base frame as determined by a spacer bar 18a which is spaced sufficiently to allow for the clearance aforesaid.

With the construction thus provided, any number of units of sections 17 may be removed and interchanged, to suit the particular requirements of the graphic assembly, to include letters or display area in unit sections to which, if desired, there may be affixed illuminated letters embodying illuminants, such as electric bulbs or neon tube elements, as the occasion may require, or they may be flat sections to which there may be affixed other elements of display, advertising matter or the like.

The assembly described is provided with end sections 24 and 25, the latter of which may carry some figurette 25a separable from the primary central area and its supporting framework so that these end sections may be supplemented by any desired end configurations, and for this purpose independent standards 26 and 27, connected by the joist 28, and standards 26a, 27a which are positioned in alignment with the panels 17 form the supporting background for the end elements at opposite sides respectively independent of the central area framework 11 previously described.

For this purpose, the upper surface 29 of the pedestal 10 is slotted to provide the grooved portions 31 to receive the base of various forms of figurettes or end sections, in accordance with the assembly of bulletin board that may be desired, which figurettes or end sections are in abutting relation with the members 30, 26a and 27a to be braced thereby.

For this purpose, in Figure 6, there is illustrated the elements 33 and 34, which may serve as end sections to be assembled with the primary central area of the bulletin board. It will also be observed that while figurettes such as 33 and 34 may be substituted for both end sections, the general rectangular contour of the framework may be retained by substituting a rectangular element for these sections 25a, as will appear from the configuration obtained in Figure 5 by the element 25.

In Figure 7, end sections 35 and 36 are shown assembled with the central frame area 11, to give a so-called modernistic contour to the bulletin board assembly.

In Figure 8, end sections 37 and 38 are illustrative of the variability of the bulletin board contemplated by my invention, to impart to the entire assembly a different form or configuration, without modification of the primary central area 11 and for this purpose the end section 37 may include an overhang 39, conforming to the general configuration of a primary section 11. Also, the end section 38 may include a configuration 40, partially overlapping the primary central area 11, augmenting the modernistic effect of the entire assembly.

In Figure 9 I have illustrated interchangeable sections 41 and 42, in the form of flat figurettes, which are interchangeable in the bulletin board construction without materially modifying the primary central display area 11.

In Figure 10 I have illustrated end sections 43 and 44, associated with each end of the central display area 11, retaining the general rectangular contour of the framework.

Figure 12:
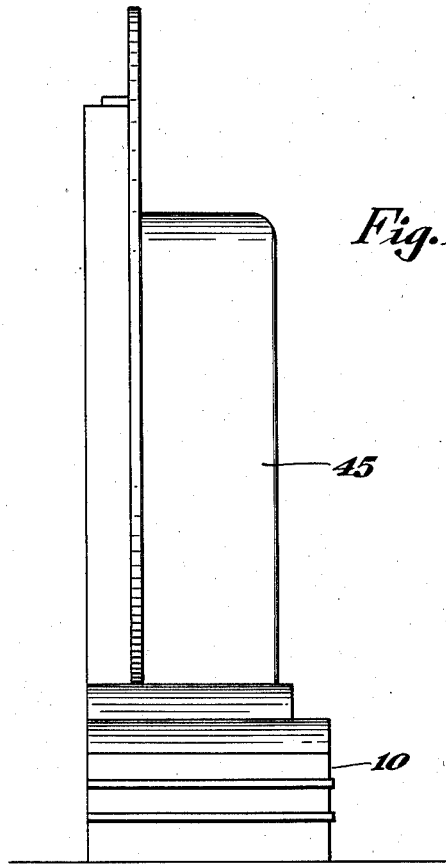
Figure 12 is an end elevation of the same.

In Figures 11 and 12, the primary central display area is shown associated with three-dimensional figures 45 and 46, showing the latitude for interchangeability provided by my invention.

It will be understood that while the primary central display area may retain its rectangular continuity in its association with the pedestal 10, additional display elements, in the form of electric signs 47, may be associated with the exterior of the framework in more or less permanent association, especially where such sign may serve equally well with any series of assemblies upon the primary display area and the variable end sections which may be associated therewith.

It will thus be apparent that I have provided a bulletin board or display device in which a primary unitary structure is capable of alteration, revision and substitution to alter the general appearance of the display area without the need or requirement for varying the supporting structure, so that a wide range of variability is possible to meet the requirements of independent advertisers and advertising programs, which may be accomplished rapidly and economically by alterations of portions thereof, rather than the complete unitary structure.

Having thus described my invention and illustrated its use, what I claim as new and desire to secure by Letters Patent, is—

1. A bulletin board construction including in combination a pedestal framework, a vertical background framework secured thereto, extended sections mounted upon said background framework forming a primary area devoted to graphic representations, end elements and means to mount said end elements in abutting relation to the framework to either side of the extended sections upon the pedestal, said means including slotted portions formed in said pedestal receiving parts of said end elements, whereby interchangeable end elements may be assembled in association with the primary area aforementioned.

2. A bulletin board construction including in combination a pedestal framework, a vertical background framework secured thereto, extended sections mounted upon said background framework forming a primary area devoted to graphic representations, an end element and means to mount said end element in abutting relation to the framework to one side of the extended sections upon the pedestal, said means including a slotted portion formed in said pedestal receiving a part of said end element, whereby an interchangeable end element may be assembled in association with the primary area aforementioned.

C. FREDERICK SMITH.